US009418572B2

(12) United States Patent
Mostafa

(10) Patent No.: US 9,418,572 B2
(45) Date of Patent: Aug. 16, 2016

(54) SYSTEM FOR ENABLING A VISUALLY IMPAIRED OR BLIND PERSON TO USE AN INPUT DEVICE HAVING AT LEAST ONE KEY

(71) Applicant: KING SAUD UNIVERSITY, Riyadh (SA)

(72) Inventor: Abdelhamid Mohamed Mostafa, Riyadh (SA)

(73) Assignee: King Saud University, Riyadh (SA)

( * ) Notice: Subject to any disclaimer, the term of this patent is extended or adjusted under 35 U.S.C. 154(b) by 238 days.

(21) Appl. No.: 14/168,069

(22) Filed: Jan. 30, 2014

(65) Prior Publication Data

US 2014/0242554 A1     Aug. 28, 2014

(30) Foreign Application Priority Data

Feb. 28, 2013    (EP) ..................................... 13157131

(51) Int. Cl.
*G09B 21/00* (2006.01)
*G06F 3/02* (2006.01)
*G06F 3/01* (2006.01)

(52) U.S. Cl.
CPC .............. *G09B 21/003* (2013.01); *G06F 3/014* (2013.01); *G06F 3/0202* (2013.01); *G06F 3/0219* (2013.01); *G09B 21/007* (2013.01)

(58) Field of Classification Search
CPC ................ G09B 21/00; G09B 21/001–21/008; G06F 3/014; G06F 3/0202; G06F 3/0219
USPC ......................................................... 434/113
See application file for complete search history.

(56) References Cited

U.S. PATENT DOCUMENTS

| 5,581,484 | A | * | 12/1996 | Prince | ..................... | G06F 3/014 340/407.1 |
| 6,159,013 | A | * | 12/2000 | Parienti | ................ | G09B 21/003 434/112 |
| 6,380,923 | B1 | * | 4/2002 | Fukumoto | ............... | G06F 1/163 341/22 |
| 2005/0089824 | A1 | * | 4/2005 | Asakawa | ............. | G09B 21/006 434/112 |
| 2006/0134586 | A1 | * | 6/2006 | Armingaud | ............ | G09B 1/003 434/113 |

FOREIGN PATENT DOCUMENTS

GB            2412629 A  * 10/2005  ............ G06F 3/0202

* cited by examiner

*Primary Examiner* — Sam Yao
*Assistant Examiner* — Kristen Dragon
(74) *Attorney, Agent, or Firm* — Renner, Otto, Boisselle & Sklar, LLP

(57) ABSTRACT

System for enabling a visually impaired or blind person to use an input device having at least one key, comprising: at least one tactile sensor array, in particular a pressure sensor array, attachable to a fingertip of a visually impaired or blind person for acquiring a pressure distribution image of a key slightly touched by a finger of said person when attached to said finger, a pressure distribution image processing and character recognition unit that is connected to said tactile sensor array for processing said pressure distribution image and for recognizing the key label of the touched key and an audio output device that is connected to said unit for outputting and acoustic reproduction of said key label.

13 Claims, 6 Drawing Sheets

SYSTEM FOR ENABLING A VISUALLY IMPAIRED OR BLIND PERSON TO USE AN INPUT DEVICE HAVING AT LEAST ONE KEY

CROSS-REFERENCE TO RELATED APPLICATION

The present application is related to and claims priority under 35 U.S.C. §119 to European Application No. 13157131.7, filed 28 Feb. 2013, the entirety of which is hereby incorporated herein by reference.

TECHNICAL FIELD

The present invention relates to a system for enabling a visually impaired or blind person to use an input device having at least one key.

BACKGROUND

As is known, electronic devices, for example PCs, DVD players, mobile phones, laptops etc., usually comprise a keyboard as an input device. The input device has dimensions and structures particularly arranged to be used by people having no visual problems.

Such input devices of a generic electronic device are not arranged to be used by visually impaired or blind people, because blind people do not have any reference on the keys in order to know which key are going to press. Even keyboards particularly arranged to be used by blinds have the following draw backs: First they need a special keyboard type (depends on Braille techniques, as for an example described in U.S. Pat. No. 7,706,509 B2) as an input device. Second, such keyboards increase the costs of for example a regular PC to be suitable for blind people usage. Also, there are further problems with respect to portability.

Similar problems arise for example with respect to all types of remote control devices that as used herein shall also be considered as input devices.

Further approaches comprise special keyboards with less keys, screen readers as well as speech recognition hardware and software.

SUMMARY

It is therefore an object of this invention to provide a system for enabling visually impaired or blind persons to use an input device having at least on key, like for example a keyboard or a remote control device, and in particular an input device that is similar to a corresponding input device for people that are not visually impaired or blind or can be achieved from a regular input device by only little modification.

This object is accomplished according to the present invention by a system for enabling a visually impaired or blind person to use an input device having at least one key, comprising: at least one tactile sensor array, in particular a pressure sensor array, attachable to a fingertip of a visually impaired or blind person for acquiring a pressure distribution image of a key slightly touched by a finger of said person when attached to said finger, a pressure distribution image processing and character recognition unit that is connected to said tactile sensor array for processing said pressure distribution image and for recognizing the key label of the touched key and an audio output device that is connected to said unit for outputting an acoustic reproduction of said key label. The key label could be for example a character, symbol, figure/number, arrow key/courser key etc. Relief-like could mean for example protruding or raised, like a raised structure. The relief-like key labels could be considered as tactile labels for tactile representation of information. So a part of the system could be considered as a system part for recognition of the key labels. The pressure distribution image processing and character recognition unit can comprise to sub-units, one for pressure distribution image processing and one for character recognition that could be physically separated.

Preferably, the system further comprises an input device having at least one key, wherein the at least one key is provided with a relief-like key label.

According to a special embodiment of the invention, the input device is a keyboard or a remote control device.

The relief-like key label could be integral with the key.

Alternatively, the relief-key label could be part of a sticker that is attached to the key, e.g. by way of pasting. In other words, regular keys could be used in combination with stickers.

Preferably the system comprises at least two tactile sensor arrays attachable to a fingertip of a visually impaired or blind person. For example the tactile sensor arrays could be attached to a fingertip of the thumb and of the index finger.

According to a special embodiment, the tactile sensor array (s) is/are part of a glove.

Conveniently the pressure distribution image processing and character recognition unit is wrist or arm mountable, i.e. mountable to a wrist or arm of the visually impaired or blind person.

Preferably, the audio output device is wrist or arm mountable, i.e. mountable to a wrist or arm of the visually impaired or blind person.

Finally, according to a special embodiment, the audio output device is a loudspeaker, in particular a loudspeaker that is incorporated in a device to which the input device belongs. For example, if the input device is a keyboard of a laptop or mobile phone, the audio output could be the loudspeaker of the laptop or the mobile phone.

The invention is based on the surprising knowledge that by way of at least one tactile sensor array an "image" of a key label can be captured and converted into a corresponding audio representation. By this visually impaired or blind persons can interact with regular input devices, in particular keyboards and remote control devices, or slightly amended (regular) input devices, in particular keyboards and remote control devices.

Furthermore, at least in a particular embodiment, most of the components of the system are portable.

BRIEF DESCRIPTION OF THE DRAWINGS

Further features and advantages of the invention will become clear from the enclosed claims and the following description, in which a number of embodiments of the invention are illustrated in detail with reference to this geometrics drawings, wherein:

DETAILED DESCRIPTION

Figure 1:
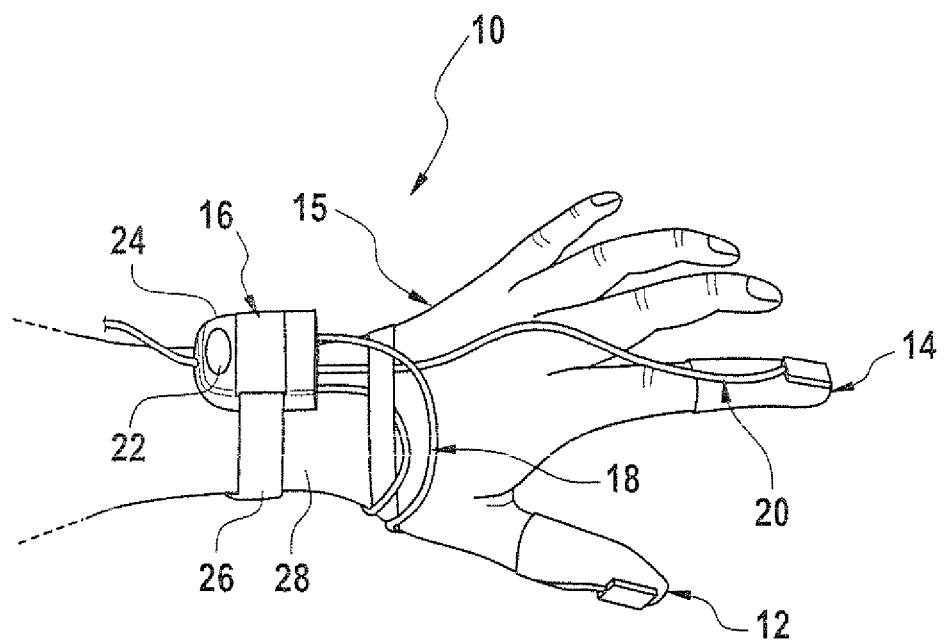
FIG. 1 shows a view of a system for enabling a visually impaired or blind person to use an input device having at least one key according to a special embodiment of the invention attached to the hand of such a person.

The system 10 of FIG. 1 comprises two pressure sensor arrays 12 and 14. The pressure sensor array 12 is arranged at a fingertip of the thumb, whereas the pressure sensor array 14 is arranged at the fingertip of the index finger of a hand 15 of a visually impaired or blind person (not shown). Said pressure sensor arrays 12 and 14 could be attached to the fingertips by way of finger cots.

Furthermore, the system 10 comprises a pressure distribution image processing and character recognition unit 16 that will be described in detail with reference to FIG. 4 below. The pressure sensor arrays 12 and 14 are electrically connected to the pressure distribution image processing and character recognition unit 16 by way of cables 18 and 20, respectively.

Also, the system 10 comprises a loudspeaker 22 that is incorporated in the same housing 24 as the character recognition unit 16. Said housing 24 is attached to a kind of wristband 26 that is attached to the wrist 28.

In the present special embodiment, the pressure sensor arrays 12 and 14 each consists of an array of 64 sensor elements distributed in eight rows and eight columns. Each sensor element is 2 mm×2 mm in size, so that the size of the total sensor array is 16 mm×16 mm. The pressure sensor arrays 12 and 14 are highly sensitive capacitive-based pressure sensors. They reliably quantify the pressure distribution under the slightly touched area. In particular, they are practical, user-configurable and comfortable. The pressure sensor arrays 12 and 14 are arranged in the respective areas that usually contact the keys of for example a keyboard.

Figure 2:
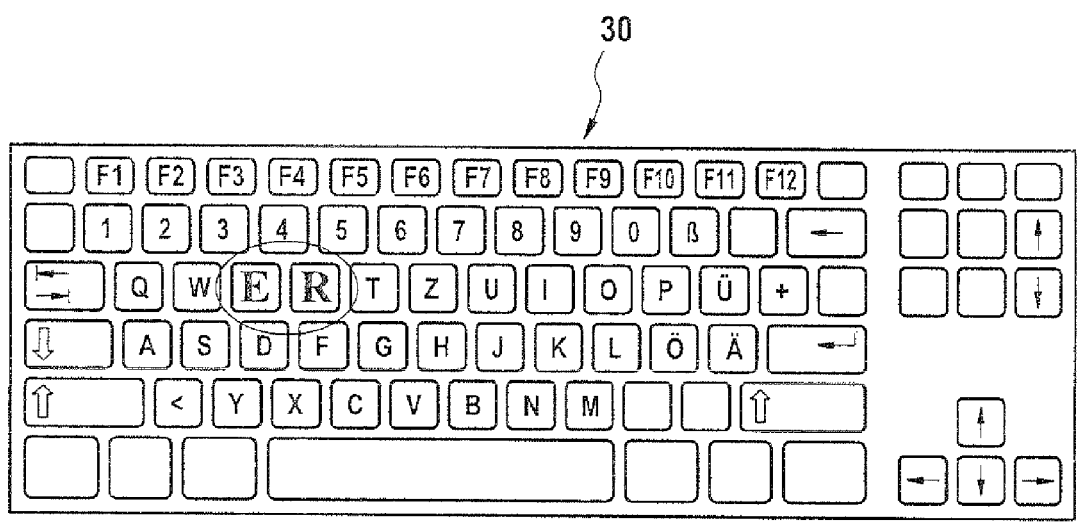
FIG. 2 shows a top view of a key board, wherein prominent (3D) stickers are pasted to the letters E and R, respectively.
Figure 3:
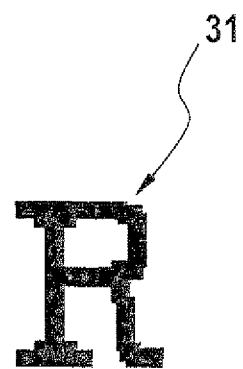
FIG. 3 shows a pressure distribution image as captured by a pressure sensor array of the letter R while being slightly touched.
Figure 5:
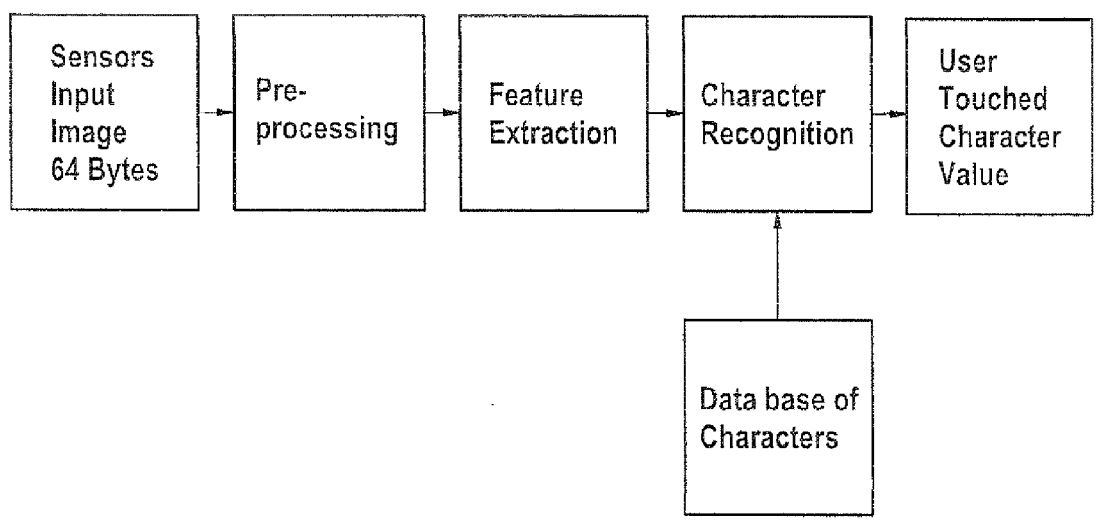
FIG. 5 shows a flow diagram of an algorithm for simplified character recognition.

FIG. 2 shows a keyboard 30. It is a regular keyboard that is adjusted through pasting a prominent three dimensional (3D) sticker on each of the key board keys. For reasons of simplicity, only the keys "E" and "R" are shown with pasted stickers with relief-like labeling. Once a visually impaired or blind person touches for example the key with the relief-like label "R" with the pressure sensor arrays 12 or 14 of FIG. 1, he/she can hear the key label/value instead of sensing it only. This task is achieved through acquiring a pressure distribution image 31 (for example gray scale image) of the slightly touched prominent key area as shown in FIG. 3 and by carrying out character recognition by means of the pressure distribution image processing and character recognition unit 16. A character recognition algorithm as shown in FIG. 5 helps to extract the key label/value and to convert it into sound that the person can hear via the loudspeaker 22. So in the present special embodiment any regular PC-keyboard, prepared with stickers, can be used by a visually impaired or blind person as an input device.

If it is the proper key which the person is looking for, he/she can take the decision of the actual use of the key.

Figure 4:
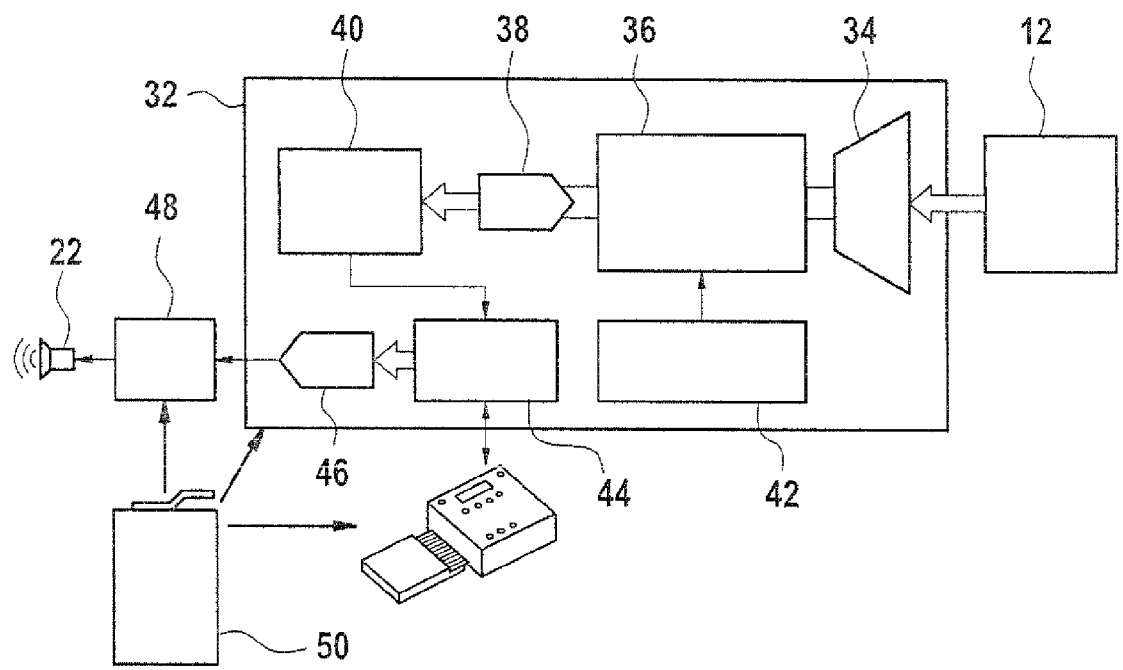
FIG. 4 shows a block diagram of the system of FIG. 1.

In FIG. 4, only one, namely pressure sensor array 12, is shown. It should be clear that the pressure sensor array 14 would be connected in a similar way. As can be seen in FIG. 4, the 64 analog signal output from the pressure sensor array 12 is input into a powerful Psoc mixed signal microcontroller 32. Said microcontroller 32 comprises a differential analog multiplexer (MUX) 34, a signal conditioner 36, a 8-bit-ADC 38, a DSP 40, a DC offset compensator 42, an uSD-reader 44 and a 8-bit-DAC 46. The sensor signals pass through the MUX 34, then the signal conditioner 36 that conditions (amplification (for example PGA), filtering (for example LPF), DC offset by DC offset compensator 42) the signals, thereafter the ADC 38 for digitization to get grey level images (64 bytes) of the slightly touched area (see FIG. 3). The pressure distribution image is further processed to extract the touched key label/value by the DSP (40 character recognition). Furthermore, the Psoc microcontroller 32 reads a sound file stored in external uSD-memory in the uSD-reader 44. The read sound file corresponds to the recognized key label/value. The Psoc microcontroller 32 then sends this sound file to an external audio amplifier 48 such that the person can hear the touched key label via the loudspeaker 22. As can be seen in FIG. 4, the components of the system that are attached to the hand of the person are powered by a battery 50.

The following specification and parameters are merely illustrative:

MUX 34: High impedance input, input signals rail-to-rail. Configurable number of inputs up to 64X1.

Signal conditioner 36: PGA: (Programmable gain) amplifier: Differential "High impedance input, wide bandwidth" low offset output voltage and up to thirty-three user-programmable gain settings with a maximal gain of 48.0".

LPF (low path filter): Programmable corner frequency and damping ratio with no external components, second order.

ADC 38: 8-bit resolution, differential input, unsigned data format, sample rate up to 15.6 ksps and input range defined by Psoc internal reference.

DSP (Digital signal processing) 40: Character recognition algorithms allow the system to automatically recognize touched key labels etc. (see FIG. 5).

uSD-Reader 44: This module interfaces to an external uSD memory card. Said memory card has a stored group of sound files. Each sound file is corresponding to one of the key label/value/character of the keyboard. When a new key label/value/character is recognized, the uSD-reader 44 reads the external uSD memory card for the corresponding sound file. Further, it sends said sound file to the DAC 46. The output of the DAC 46 is passed to the external audio amplifier 48 such that the person can hear the touched key label/value/character via the loudspeaker 22.

DAC 46: 8-bit resolution, voltage output, 2's complement, offset binary and sign/magnitude input data formats, sample and hold for analog bus and external outputs, high update rates.

Audio Amplifier 48: Low voltage, low power dissipation, wide gain range from 20 to 200, battery operation.

Battery 50: 3.6 volt, 1800 mA would be a suitable battery selection.

FIG. 5 shows a possible way of character recognition. Each of the pressure sensor arrays 12 and 14 input a pressure distribution image. Each of said pressure distribution images is pre-processed for conditioning the pressure distribution image. Each image has a size of 64 pixels. Each pixel is specified by only black, white and shades of gray. This requires only one byte to save each pixel value.

The steps included in the pre-processing are:

Dilation: Operation by which missing pixels from the binary image are filled,

Erosion: Operation by which extra pixels from the binary image are removed and the character is thinned.

In the feature extraction following the pre-processing various features are extracted like:

Number of end points
Angel made by the end points with horizontal
Cross joint
Euclidian distance
Eccentricity
Area
Centroid Thereafter character recognition is carried out by a comparison of the extracted features with the stored character features in a database of characters or labels. According to matched features the respective character/value/label is known.

Figure 6:
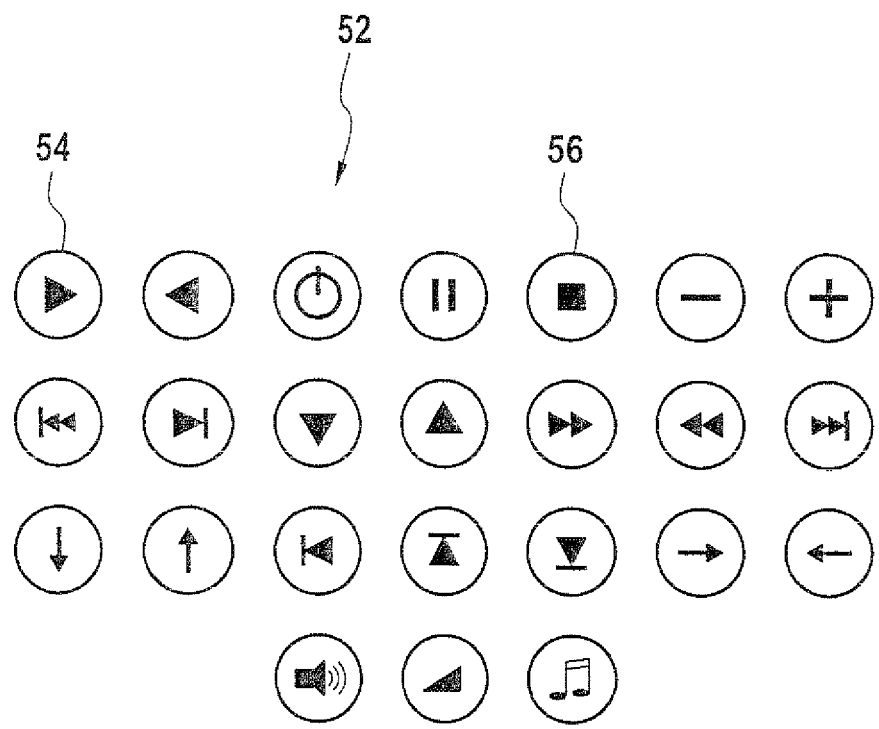
FIG. 6 shows keys with key labels of a remote control device or different remote control devices.

FIG. 6 shows the keyboard 52 or a number of keys of a remote control device, in particular a media player remote control device. It comprises among others a play key 54 and a stop key 56. When the keys have prominent key labels for example by way of prominent stickers on the regular keys, the keyboard can be used by a visually impaired or blind person with the system as shown in FIG. 1.

The features in the foregoing description, in the claims and/or in the accompanying drawings may, both and in any combination thereof, be material for realising the invention in diverse forms thereof.

LIST OF REFERENCE NUMBERS

- 10 system
- 12, 14 pressure sensor arrays
- 15 hand
- 16 pressure distribution image processing and character recognition unit
- 18, 20 cables
- 22 loudspeaker
- 24 housing
- 26 wristband
- 28 wrist
- 30 keyboard
- 31 pressure distribution image
- 32 Psoc microcontroller
- 34 MUX
- 36 signal conditioner
- 38 ADC
- 40 DSP
- 42 DC offset compensator
- 44 uSD-reader
- 46 DAC
- 48 audio amplifier
- 50 battery
- 52 keyboard
- 54 play key
- 56 stop key

The invention claimed is:

1. System for enabling a visually impaired or blind person to use an input device having at least one key, comprising:

an input device having at least one key with a key label wherein the key label comprises a protruding or raised structure, at least one tactile sensor array, attachable to a fingertip of a visually impaired or blind person for acquiring a pressure distribution image of the at least one key, wherein the at least one key is slightly touched by a finger of said person and the at least one tactile sensor array is attached to said finger, a pressure distribution image processing and character recognition unit that is connected to said tactile sensor array for processing said pressure distribution image and for recognizing the key label of the touched key and an audio output device that is connected to said unit for outputting an acoustic reproduction of said key label.

2. System according to claim 1, wherein the input device is a keyboard or a remote control device.

3. System according to claim 1, wherein the key label is integral with the key.

4. System according to claim 1, wherein the key label is part of a sticker that is attached to the key.

5. System according to claim 1, comprising at least two tactile sensor arrays attachable to a fingertip of a visually impaired or blind person.

6. System according to claim 1, wherein the tactile sensor array(s) is/are part of a glove.

7. System according to claim 1, wherein the pressure distribution image processing and character recognition unit is wrist or arm mountable.

8. System according to claim 1, wherein the audio output device is wrist or arm mountable.

9. System according to claim 1, wherein the audio device is a loudspeaker.

10. System according to claim 9 wherein the audio device is a loudspeaker that is incorporated in a device to which the input device belongs.

11. System according to claim 1 wherein the at least one tactile sensor array comprises at least one pressure sensor array.

12. System according to claim 11 wherein the at least one pressure sensor array is configured to sense the key label and to acquire the pressure distribution image from the sensed key label.

13. System according to claim 12 wherein the pressure distribution image is used to recognize the key label of the touched key and the audio output device outputs the acoustic reproduction of the key label.

\* \* \* \* \*